(12) United States Patent
Eguchi

(10) Patent No.: US 7,808,720 B2
(45) Date of Patent: Oct. 5, 2010

(54) STANDARD ZOOM LENS SYSTEM

(75) Inventor: Masaru Eguchi, Saitama (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 11/965,118

(22) Filed: Dec. 27, 2007

(65) Prior Publication Data

US 2008/0158690 A1 Jul. 3, 2008

(30) Foreign Application Priority Data

Dec. 28, 2006 (JP) .............................. 2006-354217

(51) Int. Cl.
G02B 15/14 (2006.01)

(52) U.S. Cl. ..................................... 359/689

(58) Field of Classification Search ................. 359/689, 359/676, 680–687; 396/72–88; 348/240.99–240.3
See application file for complete search history.

(56) References Cited

U.S. PATENT DOCUMENTS

| | | | |
|---|---|---|---|
| 6,597,513 B2 | 7/2003 | Minefuji | |
| 6,781,768 B2 | 8/2004 | Minefuji | |
| 6,853,496 B2 | 2/2005 | Eguchi | |
| 6,917,476 B2 | 7/2005 | Eguchi | |
| 6,943,961 B2 | 9/2005 | Eguchi | |
| 6,975,461 B2 | 12/2005 | Eguchi | |
| 7,142,372 B2 | 11/2006 | Eguchi | |
| 7,460,312 B2 * | 12/2008 | Nakamura et al. | 359/689 |
| 2002/0027721 A1 | 3/2002 | Mihara | |
| 2004/0051962 A1 | 3/2004 | Mihara | |
| 2005/0105192 A1 * | 5/2005 | Park | 359/689 |
| 2006/0176575 A1 * | 8/2006 | Katakura | 359/680 |
| 2007/0014030 A1 * | 1/2007 | Iwasawa et al. | 359/680 |
| 2008/0084616 A1 * | 4/2008 | Katakura | 359/689 |

FOREIGN PATENT DOCUMENTS

| | | |
|---|---|---|
| JP | 2002-90624 | 3/2002 |
| JP | 2002-277740 | 9/2002 |
| JP | 2003-140041 | 5/2003 |

* cited by examiner

Primary Examiner—Darryl J Collins
Assistant Examiner—Zachary Wilkes
(74) Attorney, Agent, or Firm—Greenblum & Bernstein P.L.C.

(57) ABSTRACT

A standard zoom lens system includes a negative first lens group, a positive second lens group, and a positive third lens group, in this order from the object. Upon zooming from the short focal length extremity to the long focal length extremity, the distance between the negative first lens group and the positive second lens group decreases, and the distance between the positive second lens group and the positive third lens group increases. The most image-side surface of the positive second lens group is a concave surface. The standard zoom lens system satisfies the following condition:

$$0.15 < Rs/fT < 0.18 \tag{1}$$

wherein Rs designates the radius of curvature of the most image-side surface of the positive second lens group (Rs>0); and fT designates the focal length of the entire standard zoom lens system at the long focal length extremity when an object at an infinite distance is in an in-focus state.

18 Claims, 11 Drawing Sheets

Fig. 1
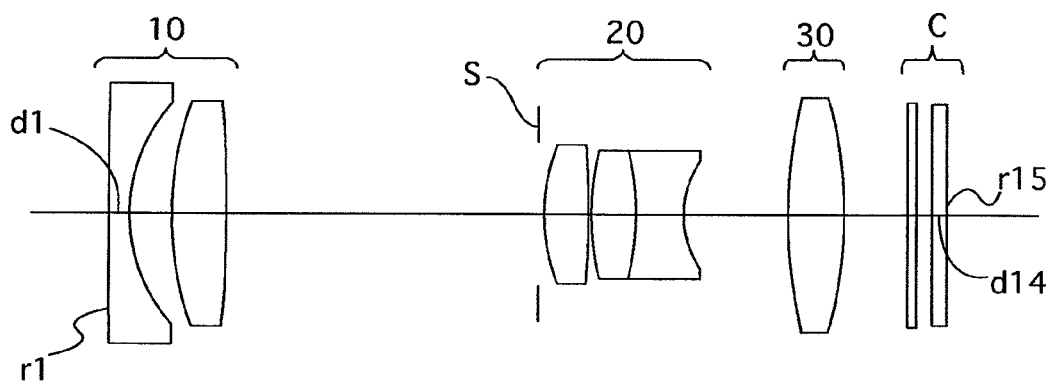
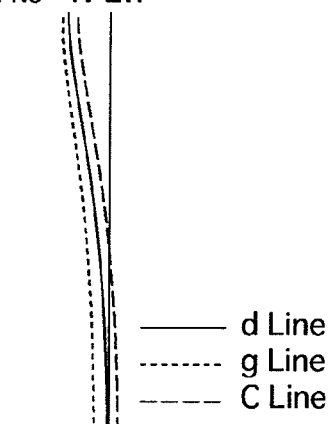
Fig. 2A
F$_{NO}$=1: 2.7
—— d Line
······ g Line
— — C Line
-0.1   0.1
SPHERICAL
ABERRATION
CHROMATIC
ABERRATION
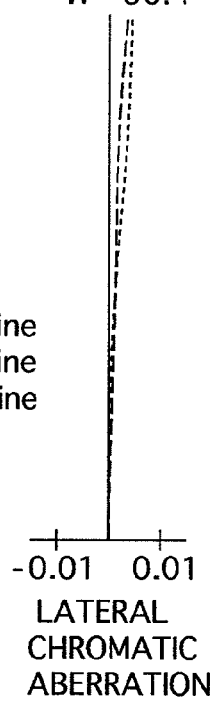
Fig. 2B
W= 30.4°
-0.01   0.01
LATERAL
CHROMATIC
ABERRATION
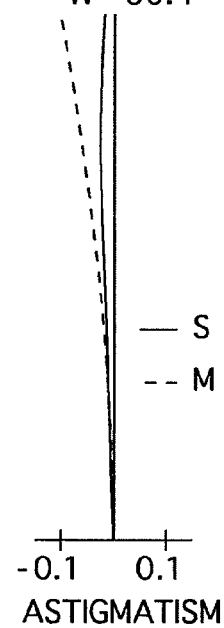
Fig. 2C
W= 30.4°
—— S
- - M
-0.1   0.1
ASTIGMATISM
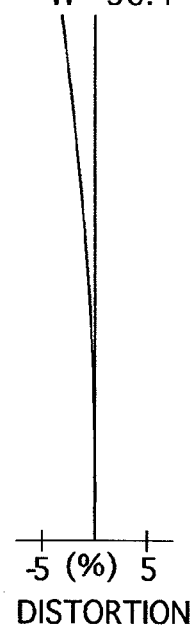
Fig. 2D
W= 30.4°
-5 (%) 5
DISTORTION

FNO= 1: 3.7

— d Line
---- g Line
—— C Line

-0.1  0.1
SPHERICAL
ABERRATION
CHROMATIC
ABERRATION

W= 17.7°

-0.01  0.01
LATERAL
CHROMATIC
ABERRATION

W= 17.7°

— S
-- M

-0.1  0.1
ASTIGMATISM

W= 17.7°

-5 (%) 5
DISTORTION

FNO= 1: 5.3

— d Line
---- g Line
—— C Line

-0.1  0.1
SPHERICAL
ABERRATION
CHROMATIC
ABERRATION

W=11.0°

-0.01  0.01
LATERAL
CHROMATIC
ABERRATION

W=11.0°

— S
-- M

-0.1  0.1
ASTIGMATISM

W=11.0°

-5 (%) 5
DISTORTION

Fig. 5
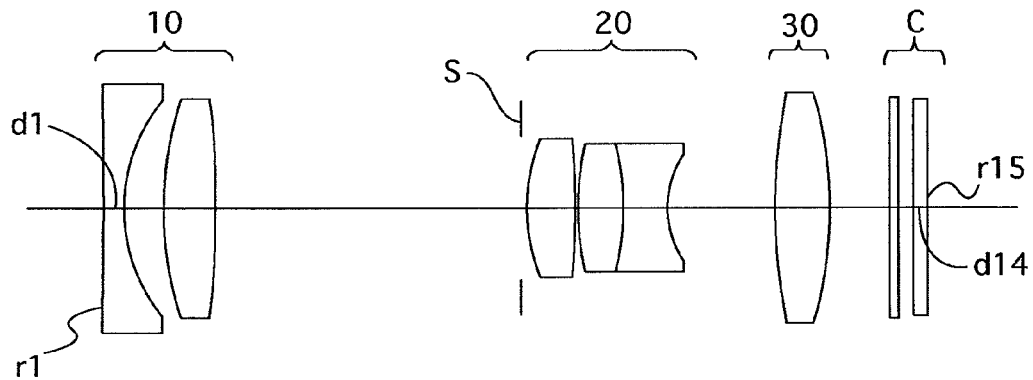
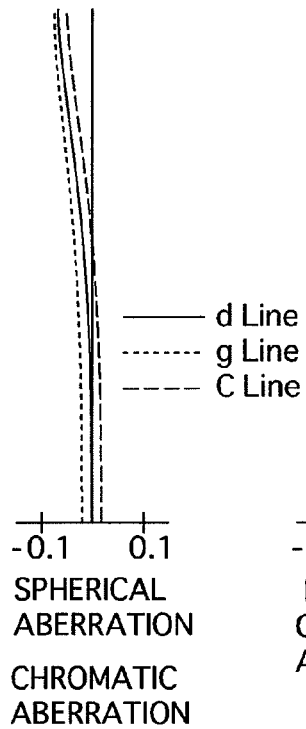
Fig. 6A
F$_{NO}$=1: 2.7
—— d Line
······ g Line
--- C Line
-0.1   0.1
SPHERICAL
ABERRATION
CHROMATIC
ABERRATION
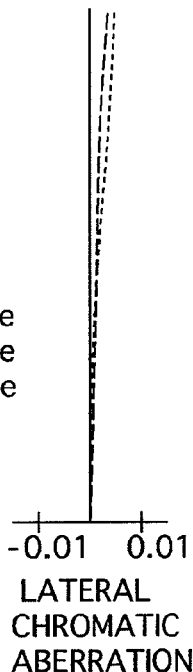
Fig. 6B
W= 30.6°
-0.01   0.01
LATERAL
CHROMATIC
ABERRATION
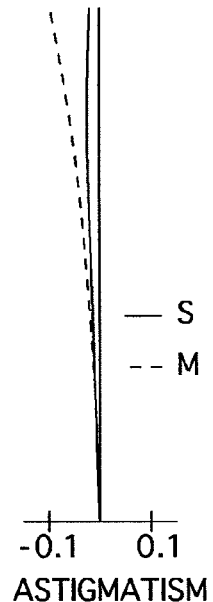
Fig. 6C
W= 30.6°
—— S
--- M
-0.1   0.1
ASTIGMATISM
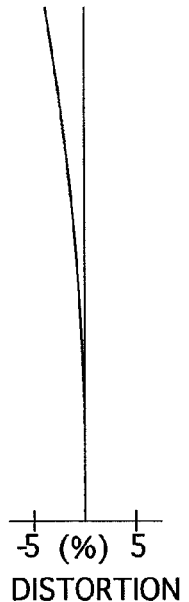
Fig. 6D
W= 30.6°
-5 (%) 5
DISTORTION

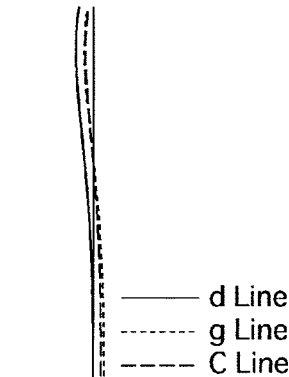
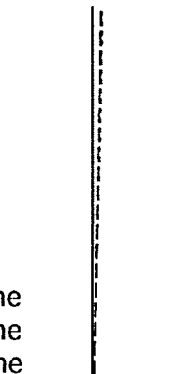
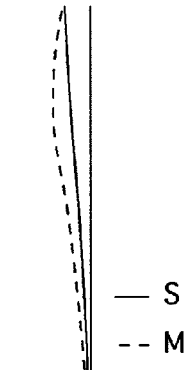
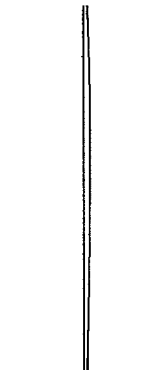
Fig. 7A  Fig. 7B  Fig. 7C  Fig. 7D
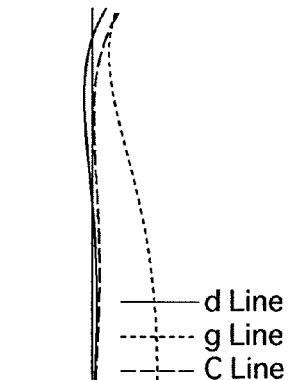
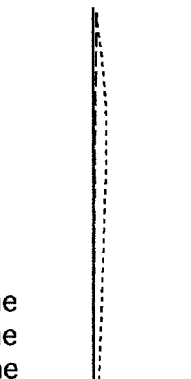
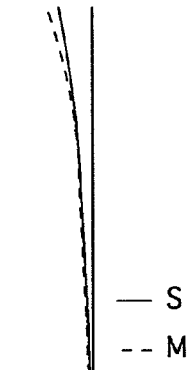
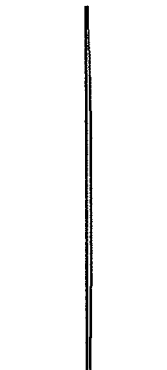
Fig. 8A  Fig. 8B  Fig. 8C  Fig. 8D Fig. 9
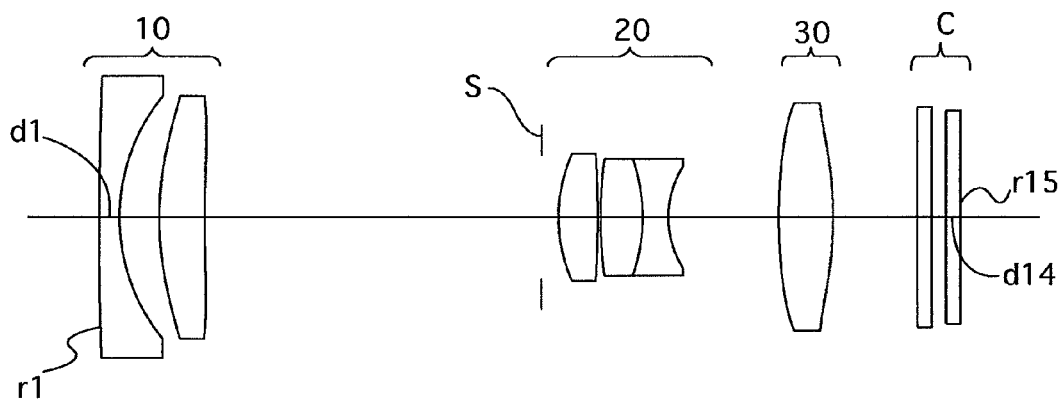
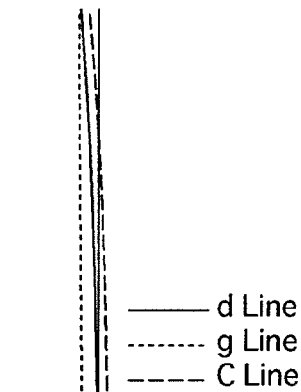
Fig. 10A
FNO=1: 2.8
SPHERICAL
ABERRATION
CHROMATIC
ABERRATION
— d Line
······ g Line
---- C Line
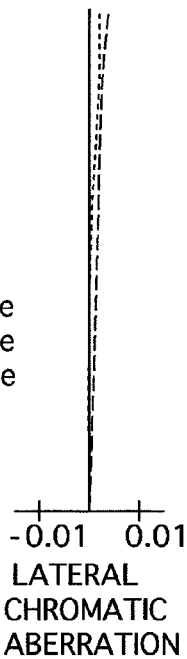
Fig. 10B
W= 31.2°
LATERAL
CHROMATIC
ABERRATION
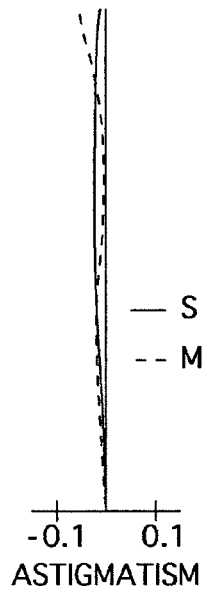
Fig. 10C
W= 31.2°
ASTIGMATISM
— S
-- M
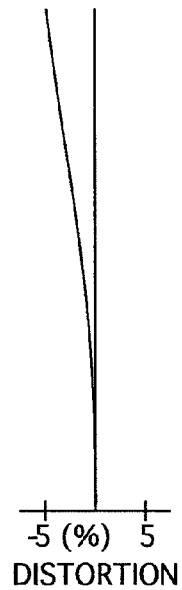
Fig. 10D
W= 31.2°
DISTORTION

FNO= 1: 3.9

— d Line
---- g Line
--- C Line

-0.1  0.1
SPHERICAL ABERRATION
CHROMATIC ABERRATION

W=19.0°

-0.01  0.01
LATERAL CHROMATIC ABERRATION

W=19.0°

— S
-- M

-0.1  0.1
ASTIGMATISM

W=19.0°

-5 (%) 5
DISTORTION

FNO= 1: 5.6

— d Line
---- g Line
--- C Line

-0.1  0.1
SPHERICAL ABERRATION
CHROMATIC ABERRATION

W=11.2°

-0.01  0.01
LATERAL CHROMATIC ABERRATION

W=11.2°

— S
-- M

-0.1  0.1
ASTIGMATISM

W=11.2°

-5 (%) 5
DISTORTION

Fig. 13
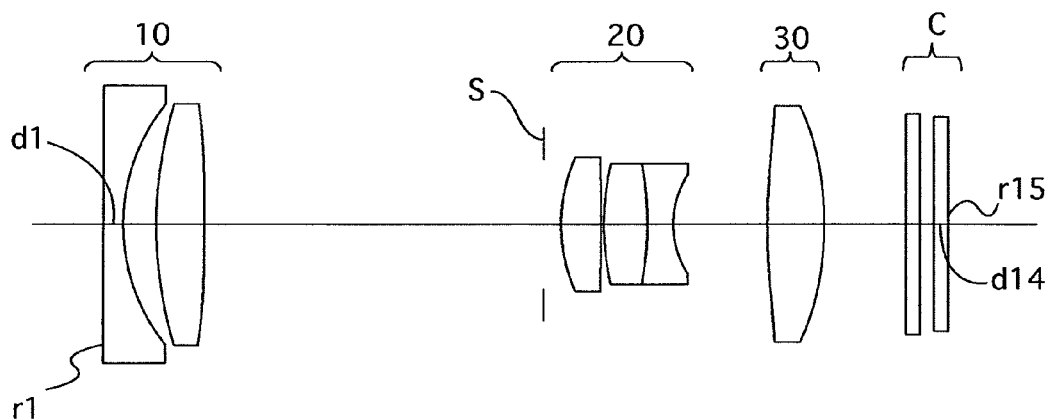
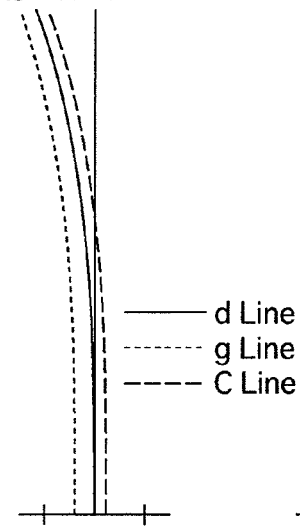
Fig. 14A
F<sub>NO</sub>= 1: 2.7
— d Line
---- g Line
----- C Line
-0.1   0.1
SPHERICAL
ABERRATION
CHROMATIC
ABERRATION
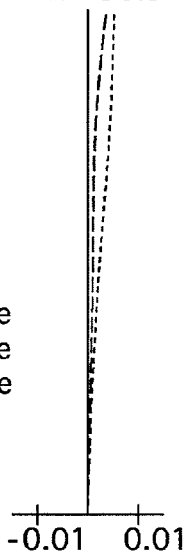
Fig. 14B
W= 30.9°
-0.01  0.01
LATERAL
CHROMATIC
ABERRATION
Fig. 14C
W= 30.9°
— S
-- M
-0.1   0.1
ASTIGMATISM
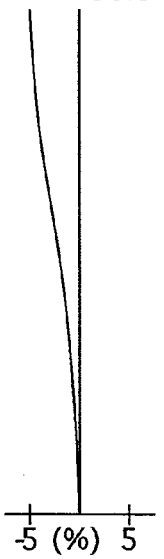
Fig. 14D
W= 30.9°
-5 (%) 5
DISTORTION

FNO= 1: 3.9

W= 18.2°

W= 18.2°

W= 18.2°

— d Line
---- g Line
— — C Line

— S
- - M

-0.1   0.1
SPHERICAL
ABERRATION
CHROMATIC
ABERRATION

-0.01  0.01
LATERAL
CHROMATIC
ABERRATION

-0.1   0.1
ASTIGMATISM

-5 (%) 5
DISTORTION

FNO= 1: 5.6

W= 11.1°

W= 11.1°

W= 11.1°

— d Line
---- g Line
— — C Line

— S
- - M

-0.1   0.1
SPHERICAL
ABERRATION
CHROMATIC
ABERRATION

-0.01  0.01
LATERAL
CHROMATIC
ABERRATION

-0.1   0.1
ASTIGMATISM

-5 (%) 5
DISTORTION

Fig. 17
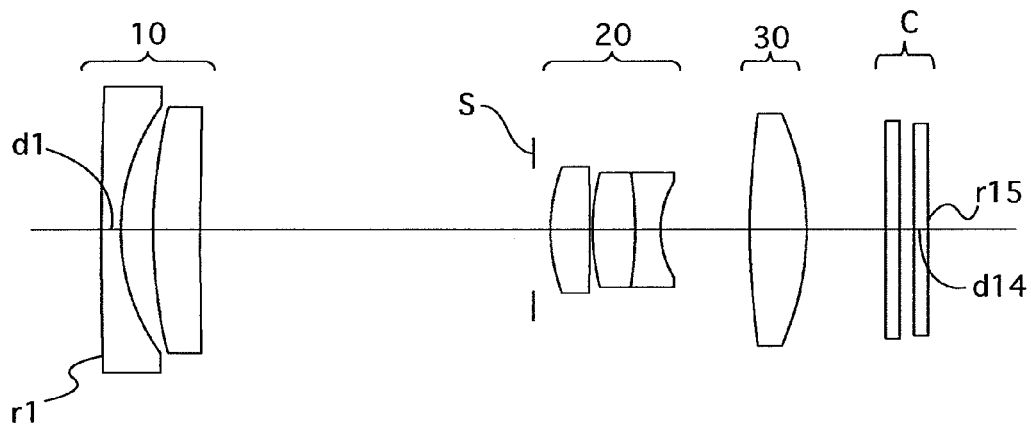
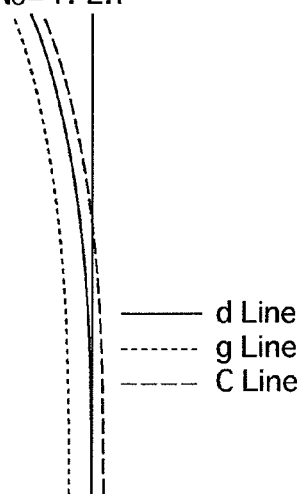
Fig. 18A
FNO=1: 2.7
— d Line
······ g Line
--- C Line
-0.1   0.1
SPHERICAL
ABERRATION
CHROMATIC
ABERRATION
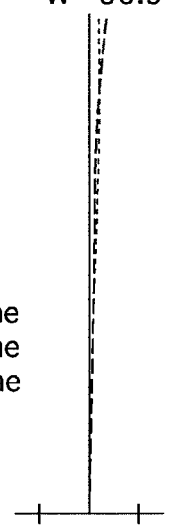
Fig. 18B
W= 30.9°
-0.01   0.01
LATERAL
CHROMATIC
ABERRATION
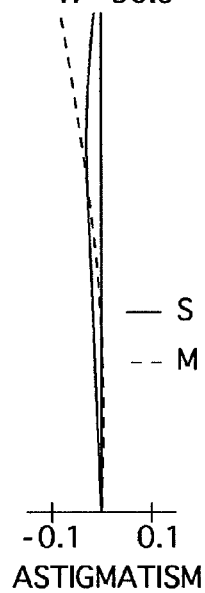
Fig. 18C
W= 30.9°
— S
-- M
-0.1   0.1
ASTIGMATISM
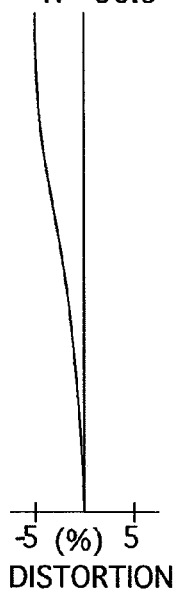
Fig. 18D
W= 30.9°
-5  (%)  5
DISTORTION

F_NO= 1: 3.9

-0.1  0.1
SPHERICAL
ABERRATION

CHROMATIC
ABERRATION

W= 18.2°

-0.01  0.01
LATERAL
CHROMATIC
ABERRATION

W= 18.2°

-0.1  0.1
ASTIGMATISM

W= 18.2°

-5 (%) 5
DISTORTION

F_NO= 1: 5.6

-0.1  0.1
SPHERICAL
ABERRATION

CHROMATIC
ABERRATION

W= 11.1°

-0.01  0.01
LATERAL
CHROMATIC
ABERRATION

W= 11.1°

-0.1  0.1
ASTIGMATISM

W= 11.1°

-5 (%) 5
DISTORTION

STANDARD ZOOM LENS SYSTEM

BACKGROUND OF THE INVENTION

1. Field of the Invention

The present invention relates to a standard zoom lens system for use in a small and light-weight digital compact camera, in particular, relates to a standard zoom lens system having the following features:

(i) telecentricity is attained;
(ii) the number of lens elements is small;
(iii) low production cost is attained;
(iv) an angle-of-view is approximately from 22° to 62°; and
(v) a zoom ratio is approximately 3.

2. Description of the Prior Art

In recent years, further miniaturization of digital compact cameras have progressed due to further miniaturization of electronic components; and thereby, further miniaturization of the photographing optical system is also required.

On the other hand, due to further progress in higher pixelization of imaging devices, the photographing optical systems are required to have higher resolution. Moreover, in order to prevent shading and color shift, excellent telecentricity by which light emitting from the most image-side lens surface is orthogonally incident on the imaging surface is required in the photographing optical system of a digital camera.

As a standard zoom lens system for use in a compact digital camera, a negative-lead type lens system is often employed in the case of a zoom ratio up to approximately 3.

A negative-lead type lens system can achieve a wider angle-of-view at the short focal length extremity, and can have smaller lens diameters, especially the diameter of the most object-side lens group can be made smaller. Therefore a negative-lead type lens system is suitable for a retractable zoom lens system in which the distance between each lens group is reduced as the lens groups retract, in an optical axis direction thereof, to an accommodation position.

Furthermore, since the exit pupil needs to be positioned sufficiently far from the imaging plane, a negative-lead type lens system of a three-lens-group arrangement, i.e., a lens group having a negative refractive power (hereinafter, a negative lens group), a lens group having a positive refractive power (hereinafter, a positive lens group) and a positive lens group in this order from the object, is often used.

Examples of the prior art can be found in Japanese Unexamined Patent Publication Nos. 2002-277740, 2002-90624 and 2003-140041.

Japanese Unexamined Patent Publication No. 2002-277740 discloses zoom lens systems having a zoom ratio of approximately 2.4 to 3; however, it is understood from this publication that a zoom lens system with a larger zoom ratio, the entire length thereof becomes longer accordingly. Therefore sufficient miniaturization of the zoom lens system cannot be achieved.

Japanese Unexamined Patent Publication No. 2002-90624 discloses a zoom lens system of a four-lens-groups arrangement with a relatively large number of lens elements, so that such a zoom lens system does not satisfy the requirement of low production costs. Furthermore, the diameter of the most object-side lens group and the overall length of the zoom lens system are large with respect to the focal length, so that miniaturization thereof is insufficient.

Japanese Unexamined Patent Publication No. 2003-140041 discloses a relatively inexpensive optical system having a reduced number of lens elements; however, the thickness of each lens group is large. As a result, the length of the zoom lens system in the fully-retracted state becomes longer, which increases the size of the zoom lens system.

The miniaturization of a retractable standard zoom lens system requires both a reduction in the overall length of the zoom lens system and a reduction in the thickness of each lens group. Generally, the reduction of the number of lens elements, in order to miniaturize the zoom lens system and reduce the thickness of the lens groups, increases difficulties in correcting aberrations. In order to achieve miniaturization while adequately correcting various aberrations over the entire zooming range, appropriate refractive power distribution over each lens group and an appropriate lens arrangement are required.

SUMMARY OF THE INVENTION

The present invention is to provide a smaller standard zoom lens system having a angle-of-view approximately from 22° up to 62°, having a zoom ratio of approximately 3, and having excellent optical performance.

According to an aspect of the present invention, there is provided a standard zoom lens system including a negative first lens group having a negative refractive power (hereinafter, a negative first lens group), a second lens group having a positive refractive power (hereinafter, a positive second lens group), and a third lens group having a positive refractive power (hereinafter, a positive third lens group), in this order from the object.

Upon zooming from the short focal length extremity to the long focal length extremity, the distance between the negative first lens group and the positive second lens group decreases, and the distance between the positive second lens group and the positive third lens group increases.

The negative first lens group includes a negative lens element and a positive lens element, in this order from the object.

The most image-side surface of the positive second lens group is a concave surface.

The standard zoom lens system satisfies the following condition:

$$0.15 < Rs/fT < 0.18 \qquad (1)$$

wherein

Rs designates the radius of curvature of the most image-side surface of the positive second lens group (Rs>0); and fT designates the focal length of the entire standard zoom lens system at the long focal length extremity when an object at an infinite distance is in an in-focus state.

It is preferable that the positive second lens group include a biconvex positive lens element, and cemented lens elements having a positive lens element and a negative lens element, in this order from the object.

The standard zoom lens system of the present invention preferably satisfies the following conditions:

$$1.65 < NP2 \qquad (2)$$

$$45 < \nu p \qquad (3)$$

wherein

NP2 designates the refractive index of the d-line of the most object-side positive lens element of the positive second lens group; and $\nu p$ designates the Abbe number of the most object-side positive lens element of the positive second lens group.

The positive lens element of the negative first lens group is preferably formed as a plastic lens element having at least one aspherical surface.

The positive plastic lens element of the negative first lens group preferably satisfies the following condition:

$$-1.0 < f1/f1p < -0.3 \ (f1 < 0) \quad (4)$$

wherein f1 designates the focal length of the negative first lens group; and f1p designates the focal length of the positive plastic lens element of the negative first lens group.

The positive third lens group preferably functions as a focusing lens group which is movable along the optical axis with respect to an object at a close-distance.

Furthermore, the positive third lens group is preferably constituted by a biconvex positive plastic lens element having at least one aspherical surface.

The biconvex positive plastic lens element of the positive third lens group preferably satisfies the following condition:

$$0.6 < f2/f3p < 1.0 \quad (5)$$

wherein f2 designates the focal length of the positive second lens group; and f3p designates the focal length of the biconvex positive plastic lens element of the positive third lens group.

The positive third lens group is arranged to move monotonically toward the image upon zooming from the short focal length extremity to the long focal length extremity, and satisfies the following condition:

$$0.05 < \log(m3t/m3w)/\log(fT/fW) < 0.3 \quad (6)$$

wherein fT designates the focal length of the entire standard zoom lens system at the long focal length extremity when an object at an infinite distance is in an in-focus state;

fW designates the focal length of the entire standard zoom lens system at the short focal length extremity when an object at an infinite distance is in an in-focus state;

m3t designates a magnification of the positive third lens group at the long focal length extremity when an object at an infinite distance is in an in-focus state; and m3W designates a magnification of the positive third lens group at the short focal length extremity when an object at an infinite distance is in an in-focus state.

In the positive second lens group, each lens surface of the most object-side positive lens element is preferably formed as an aspherical surface on which the curvature becomes gentler from the central portion toward the peripheral portion, compared to a paraxial spherical surface of the aspherical surface.

The above-explained standard zoom lens system can be applied to a camera having a camera body with a shutter button and a main switch thereon, and with a charge-coupled device (CCD: the image plane) and a liquid crystal display (LCD) therein; and the following condition is preferably satisfied:

$$t1/Y\max < 1.2 \quad (7)$$

wherein t1 designates the distance from the most object-side surface to the most image-side surface of the negative first lens group; and Ymax designates the maximum image height at the image plane on which an image through the entire standard zoom lens system is formed.

The present disclosure relates to subject matter contained in Japanese Patent Application No. 2006-354217 (filed on Dec. 28, 2006) which is expressly incorporated herein in its entirety.

BRIEF DESCRIPTION OF THE DRAWINGS

The present invention will be discussed below in detail with reference to the accompanying drawings, in which:

FIG. 1 is a lens arrangement of the standard zoom lens system, at the short focal length extremity, according to a first embodiment of the present invention;

FIGS. 2A, 2B, 2C and 2D show aberrations occurred in the lens arrangement shown in FIG. 1 at the short focal length extremity;

FIG. 5 is a lens arrangement of the standard zoom lens system, at the short focal length extremity, according to a second embodiment of the present invention;

FIGS. 6A, 6B, 6C and 6D show aberrations occurred in the lens arrangement shown in FIG. 5 at the short focal length extremity;

FIGS. 7A, 7B, 7C and 7D show aberrations occurred in the lens arrangement shown in FIG. 5 at an intermediate focal length;

FIGS. 8A, 8B, 8C and 8D show aberrations occurred in the lens arrangement shown in FIG. 5 at the long focal length extremity;

FIG. 9 is a lens arrangement of the standard zoom lens system, at the short focal length extremity, according to a third embodiment of the present invention;

FIGS. 10A, 10B, 10C and 10D show aberrations occurred in the lens arrangement shown in FIG. 9 at the short focal length extremity;

FIG. 13 is a lens arrangement of the standard zoom lens system, at the short focal length extremity, according to a fourth embodiment of the present invention;

FIGS. 14A, 14B, 14C and 14D show aberrations occurred in the lens arrangement shown in FIG. 13 at the short focal length extremity;

FIG. 17 is a lens arrangement of the standard zoom lens system, at the short focal length extremity, according to a fifth embodiment of the present invention;

FIGS. 18A, 18B, 18C and 18D show aberrations occurred in the lens arrangement shown in FIG. 17 at the short focal length extremity;

DESCRIPTION OF THE PREFERRED EMBODIMENTS

Figure 3A:
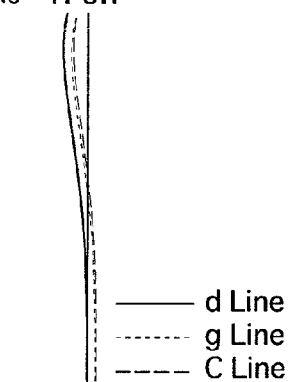
FIGS. 3A, 3B, 3C and 3D show aberrations occurred in the lens arrangement shown in FIG. 1 at an intermediate focal length.
Figure 3B:
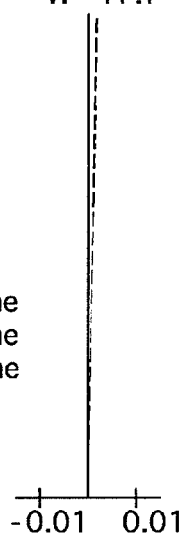
Figure 3C:
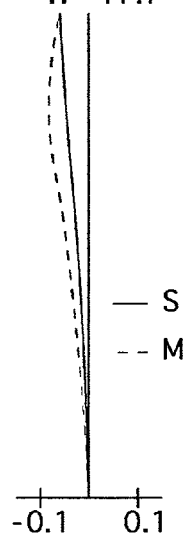
Figure 3D:
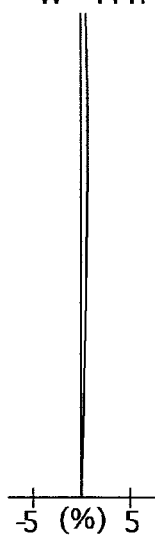
Figure 4A:
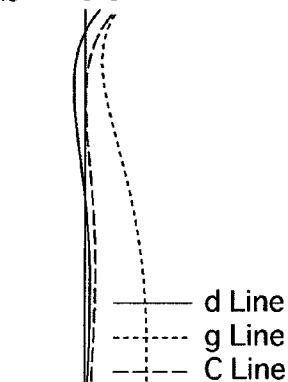
FIGS. 4A, 4B, 4C and 4D show aberrations occurred in the lens arrangement shown in FIG. 1 at the long focal length extremity.
Figure 4B:
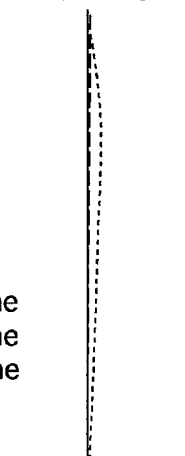
Figure 4C:
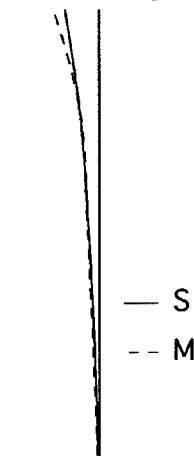
Figure 4D:
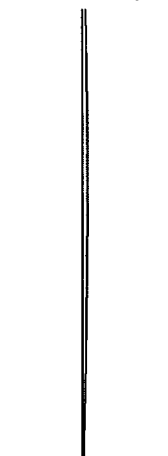
Figure 11A:
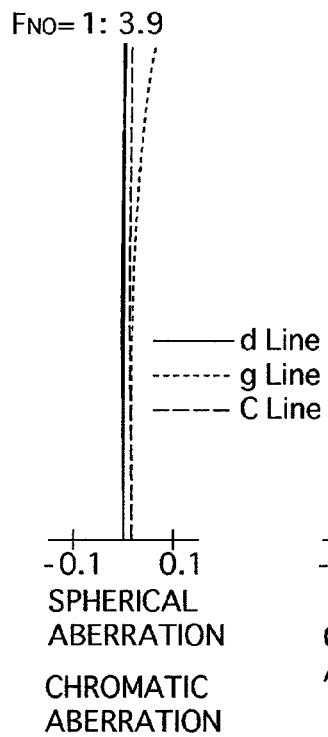
FIGS. 11A, 11B, 11C and 11D show aberrations occurred in the lens arrangement shown in FIG. 9 at an intermediate focal length.
Figure 11B:
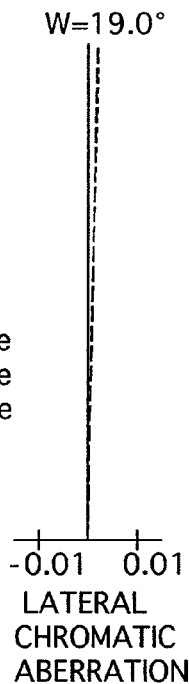
Figure 11C:
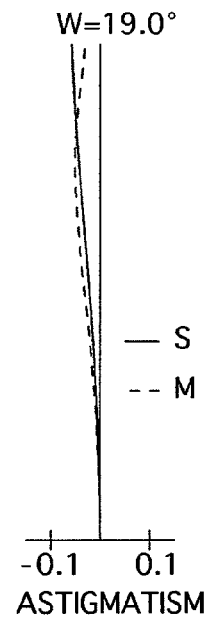
Figure 11D:
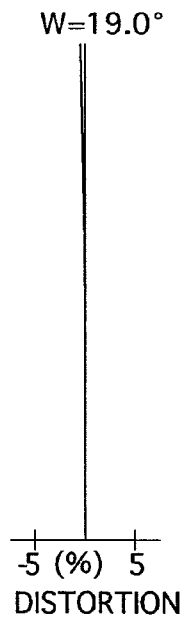
Figure 12A:
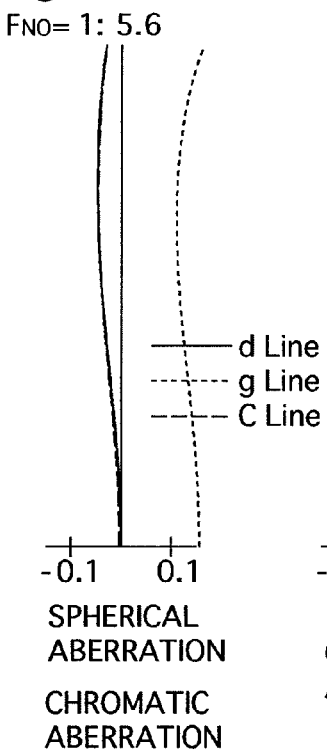
FIGS. 12A, 12B, 12C and 12D show aberrations occurred in the lens arrangement shown in FIG. 9 at the long focal length extremity.
Figure 12B:
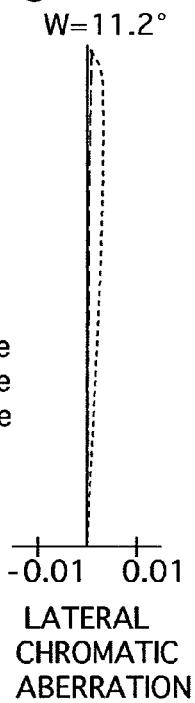
Figure 12C:
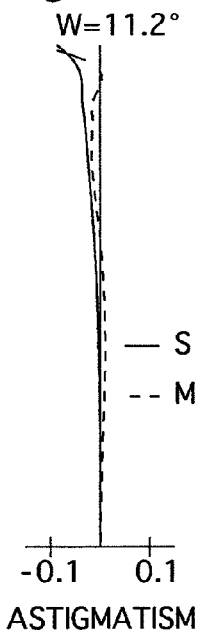
Figure 12D:
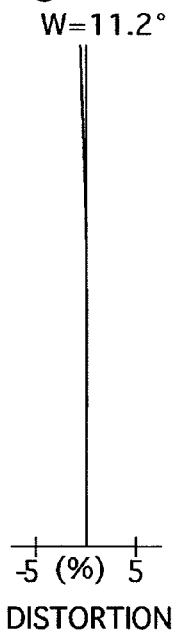
Figure 15A:
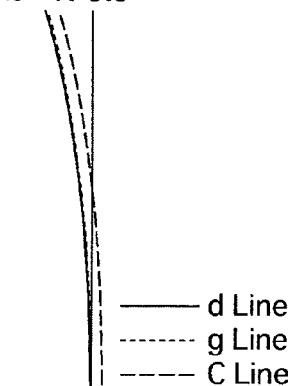
FIGS. 15A, 15B, 15C and 15D show aberrations occurred in the lens arrangement shown in FIG. 13 at an intermediate focal length.
Figure 15B:
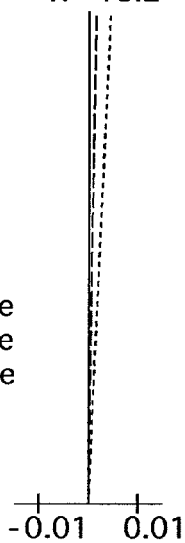
Figure 15C:
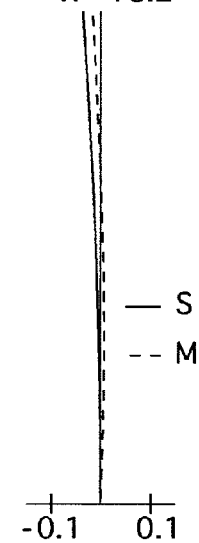
Figure 15D:
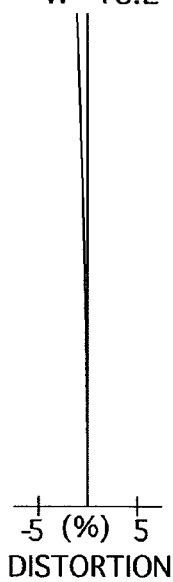
Figure 16A:
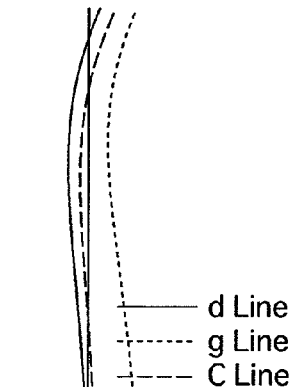
FIGS. 16A, 16B, 16C and 16D show aberrations occurred in the lens arrangement shown in FIG. 13 at the long focal length extremity.
Figure 16B:
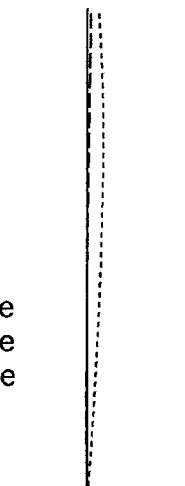
Figure 16C:
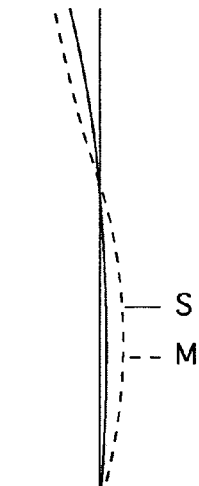
Figure 16D:
Figure 19A:
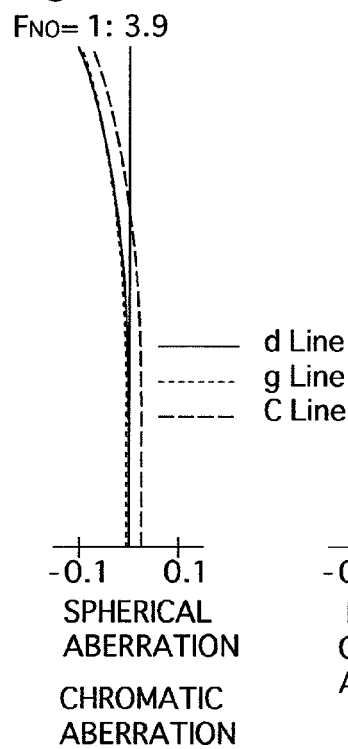
FIGS. 19A, 19B, 19C and 19D show aberrations occurred in the lens arrangement shown in FIG. 17 at an intermediate focal length.
Figure 19B:
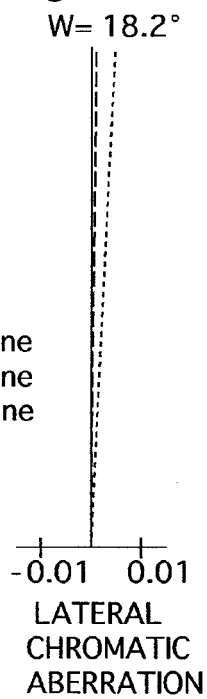
Figure 19C:
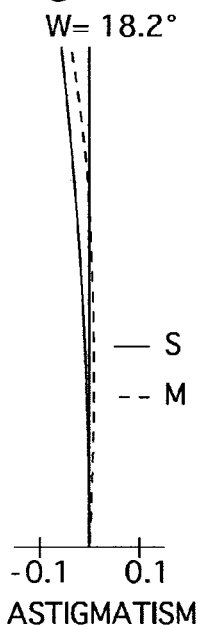
Figure 19D:
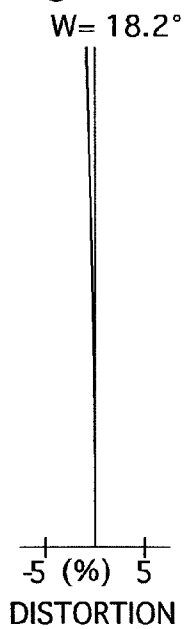
Figure 20A:
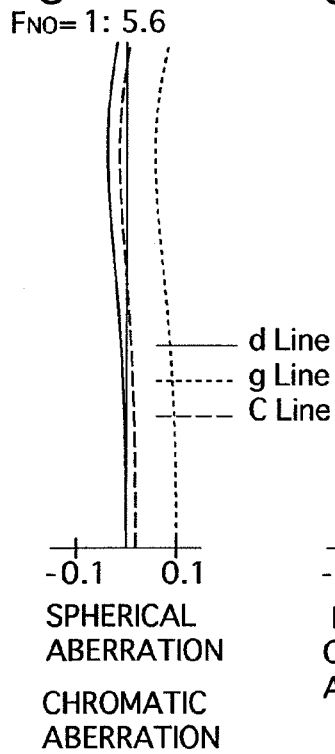
FIGS. 20A, 20B, 20C and 20D show aberrations occurred in the lens arrangement shown in FIG. 17 at the long focal length extremity.
Figure 20B:
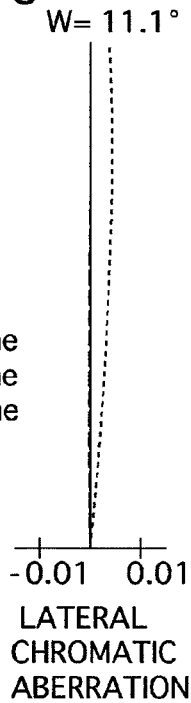
Figure 20C:
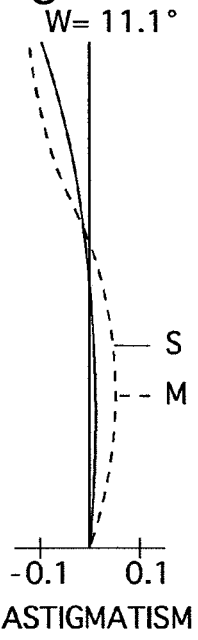
Figure 20D:
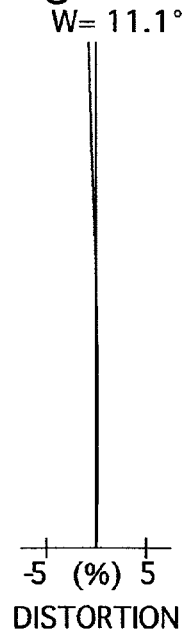
Figure 21:
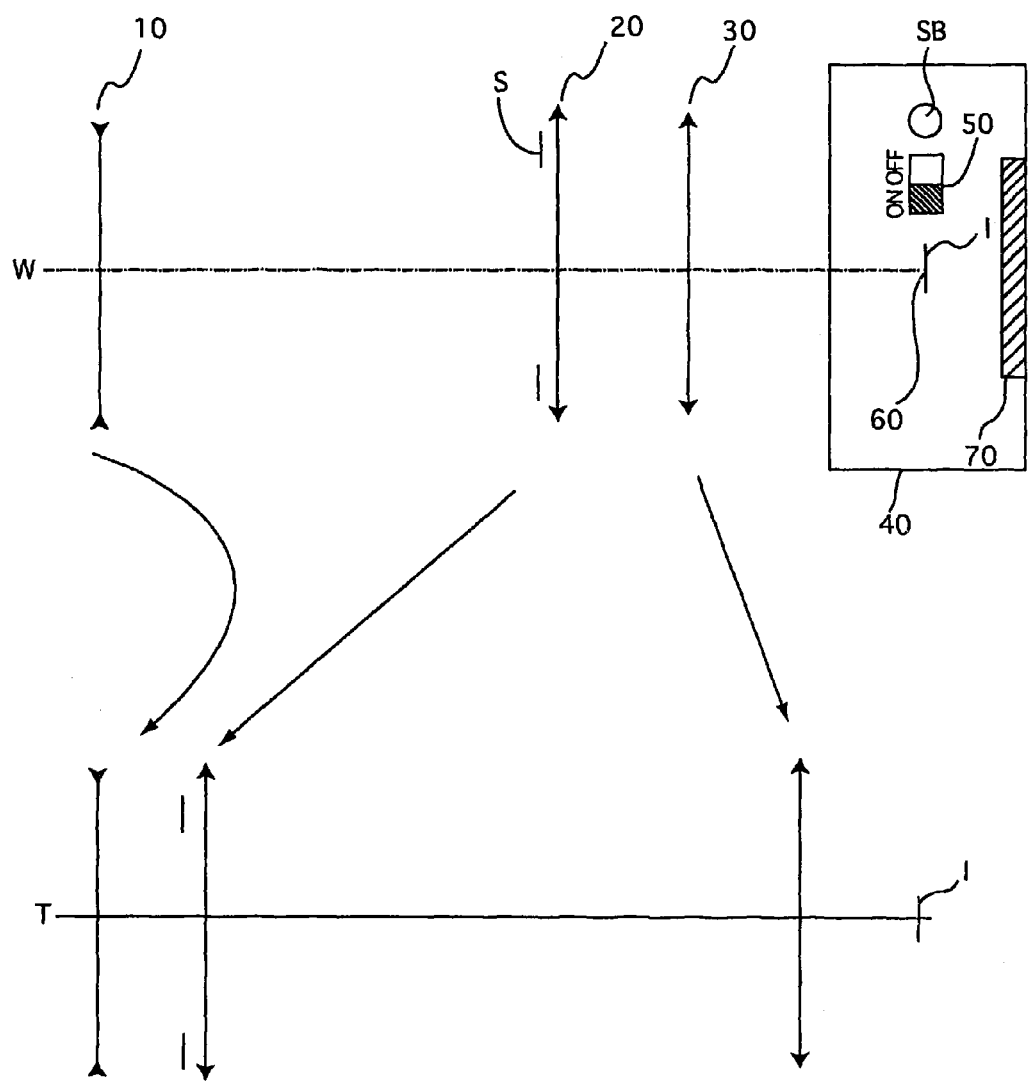
FIG. 21 is a lens-group moving paths of the wide-angle zoom lens system according to the present invention.

The standard zoom lens system of the present invention, as shown in FIG. 21, includes a negative first lens group 10, a positive second lens group 20, and a positive third lens group 30, in this order from the object.

Upon zooming from the short focal length extremity (W) to the long focal length extremity (T), the negative first lens group 10 first moves toward the image and thereafter moves toward the object, the positive second lens group 20 moves monotonically toward the object, and the positive third lens group 30 moves monotonically toward the image.

During this zooming operation, the distance between the negative first lens group 10 and the positive second lens group 20 decreases, and the distance between the positive second lens group 20 and the positive third lens group 30 increases.

A (aperture-size variable) diaphragm S is provided between the negative first lens group 10 and the positive second lens group 20, and integrally moves with the positive second lens group 20.

Focusing is performed by the positive third lens group 30.

A cover glass (filter group) C is provided behind the positive third lens group 30, and is positioned in front of an imaging device.

'I' designates the imaging plane.

Also, as shown in FIG. 21, the standard zoom lens system of the present invention can be applied to a camera having a camera body 40 with a shutter button SB and a main switch 50 thereon, and with a charge-coupled device (CCD: the image plane "I") 60 and a liquid crystal display (LCD) 70 therein.

As shown in the embodiments of FIGS. 1, 5, 9, 13 and 17, the negative first lens group 10 includes a negative lens element and a positive lens element, in this order from the object; the positive second lens group 20 includes a biconvex positive lens element, and cemented lens elements having a positive lens element and a negative lens element, in this order from the object; and the positive third lens group 30 includes a biconvex positive lens element.

A zoom lens system for use in a digital camera is required to have telecentricity; however, an attempt to attain telecentricity causes difficulty in achieving further miniaturization of the zoom lens system. Namely, in order to reduce the overall length of the zoom lens system while maintaining telecentricity, improvement is required in the distribution of refractive power over each lens group and in the lens arrangement.

In the embodiments of the present invention, the most image-side surface of the positive second lens group 20 is improved to be formed as a concave surface (diverging surface) so that a sufficient height of off-axis light rays, from the optical axis, at the short focal length extremity is secured. Consequently, light rays are made parallel to the optical axis by the positive third lens group 30 having a comparatively strong refractive power. By this arrangement, the overall length of the standard zoom lens system is made shorter, and at the same time, telecentricity is achieved.

Condition (1) specifies the ratio of the radius of curvature of the most image-side surface of the positive second lens group 20 to the focal length of the entire standard zoom lens system at the long focal length extremity when an object at an infinite distance is in an in-focus state.

The most image-side surface of the positive second lens group 20 is formed as a concave surface (diverging surface); and thereby, it becomes possible to reduce the distance between the positive third lens group 30 and the positive second lens group 20. This is because due to the concave surface, a sufficient height of off-axis light rays, from the optical axis, at the short focal length extremity is secured.

If Rs/fT exceeds the lower limit of condition (1), the divergent refractive power becomes stronger; and thereby, the positive refractive power of the positive third lens group 30 needs to be made stronger in order to maintain telecentricity. Consequently, it becomes difficult to reduce the change in field curvature at the long focal length extremity when an object at a closer distance is photographed.

If Rs/fT exceeds the upper limit of condition (1), the divergent refractive power becomes weaker; and thereby, at the short focal length extremity, off-axis light rays cannot be away from the optical axis within a shorter distance between the positive second lens group 20 and the positive third lens group 30. Consequently, the overall length of the standard zoom lens system inevitably becomes longer. Here, if an attempt is made to make the overall length of the standard zoom lens system shorter, a refractive power of each lens group has to be made stronger, so that the correcting of aberrations becomes difficult.

If the overall length of the standard zoom lens system is reduced, the positive refractive power of the entire zoom lens system becomes stronger. As a result, the Petzval sum becomes larger, and field curvature is undesirably under-corrected.

In the embodiments of the present invention, the positive second lens group 20 to which most of the positive refractive power of the entire standard zoom lens system is distributed is constituted by a (object-side) positive lens element, a (image-side) positive lens element and a negative lens element, in this order from the object.

In addition to the above-explained lens arrangement, the refractive index of the object-side positive lens element where spherical aberration and coma are effectively corrected, and the height of off-axis light rays from the optical axis becomes maximum is adequately determined so that condition (2) is satisfied, while the image-side positive lens element and the negative lens element are cemented to each other.

If the refractive index of the d-line of the object-side positive lens element of the positive second lens group 20 becomes smaller to the extent that NP2 exceeds the lower limit of condition (2), the Petzval sum becomes larger, and field curvature is under-corrected over the entire zooming range from the short focal length extremity to the long focal length extremity.

The object-side positive lens element of the positive second lens group 20 is preferably made by a material satisfying the following condition:

$$1.75 < NP2 \qquad (2')$$

Condition (3) specifies the range of the Abbe number of the object-side positive lens element of the positive second lens group 20.

If the Abbe number becomes smaller to the extent that vp exceeds the lower limit of condition (3), the correcting of axial chromatic aberration at the long focal length extremity becomes difficult. The negative first lens group 10 is constituted by a negative lens element and a positive lens element, in this order from the object in order to reduce the length of the standard zoom lens system in the fully-retracted position.

Furthermore, in order to reduce production cost, at least the positive lens element is preferably formed as a plastic lens element; and it is also preferable to form an aspherical surface on at least one of surfaces of the positive lens element in order to obtain higher optical performance.

On the other hand, in comparison with a glass lens element, a plastic lens element has a larger linear-expansion coefficient, and the refractive index of a plastic lens element largely varies according to temperature change. Therefore in order to reduce influence of the temperature change, the refractive power of a plastic lens element needs to be weaker.

Condition (4) is provided to be satisfied by the positive lens element of the negative first lens group 10 in the case where the positive lens element is formed as a (positive) plastic lens element.

If f1/f1p exceeds the lower limit of condition (4), the refractive power of the positive plastic lens element becomes too strong, deterioration of optical performance due to the temperature change becomes noticeable.

If the refractive power of the positive plastic lens element becomes weaker to the extent that f1/f1p exceeds the upper limit of condition (4), the correcting of chromatic aberration at the short focal length extremity and the long focal length extremity becomes difficult, while influence of the temperature change is reduced.

The positive third lens group 30 is a focusing lens group which is movable along the optical axis direction to perform focusing with respect to an object at a closer distance. The positive third lens group 30 is preferably constituted by a positive bi-convex lens element having at least one aspherical surface, and also preferably satisfies condition (5).

By satisfying condition (5), off-axis light rays diverging from the most image-side of surface of the positive second lens group 20 are made parallel with the optical axis through the positive refractive power of the positive third lens group 30, i.e., the light rays emitted from the positive third lens group 30 has telecentricity.

If f2/f3p exceeds the lower limit of condition (5), the refractive power of the positive third lens group 30 becomes weaker, so that it becomes difficult to maintain telecentricity, while miniaturization of the standard zoom lens system is attained.

If f2/f3p exceeds the upper limit of condition (5), the refractive power of the positive third lens group 30 becomes too strong, optical performance of the standard zoom lens system upon focusing undesirably varies largely due to changes in distance when an object at a closer distance is photographed.

In the standard zoom lens system according to the embodiments of the present invention, a magnification is increased by monotonically moving the positive third lens group 30 toward the image from the short focal length extremity to the long focal length extremity.

Condition (6) defines how much the magnification of the positive third lens group 30 contributes to the zoom ratio of the entire standard zoom lens system.

If log(m3t/m3w)/log(fT/fW) exceeds the lower limit of condition (6), the amount of the magnification of the positive third lens group 30 with respect to that of the entire standard zoom lens system becomes smaller. Consequently, the positive second lens group 20 shoulders a burden on an increasing magnification, and thereby, the correcting of aberrations becomes difficult when the standard zoom lens system is miniaturized.

If log(m3m3w)/log(fT/fW) exceeds the upper limit of condition (6), the traveling distance of the positive third lens group 30 becomes longer. Consequently, the positive refractive power of the positive third lens group 30 needs to be stronger in order to prevent an insufficient back focal distance; and thereby, it becomes difficult to reduce the change in field curvature at the long focal length extremity when an object at a closer distance is photographed.

The most object-side lens element of the positive second lens group 20 is a positive lens element having a principal positive refractive power in the entire standard zoom lens system, and is arranged to correct spherical aberration and coma which occur over the entire zooming range when the overall length of the standard zoom lens system is made shorter.

Therefore it is preferable that at least one surface of the most object-side lens element be an aspherical surface.

It is further preferable that each lens surface of the most object-side positive lens element be formed as an aspherical surface on which the curvature becomes gentler from the central portion toward the peripheral portion, compared to paraxial spherical surface of the aspherical surface. By this arrangement, a burden on the correcting of aberrations can be shared by each aspherical surface, and the occurrence of aberrations on each surface can be reduced. As a result, a degree of sensitivity on deterioration of the optical performance due to decentration of lens elements in the assembling process can be minimized.

In order to reduce the overall length of the standard zoom lens system in an fully-retracted state, it is necessary to reduce the number of lens elements in each lens group.

When the negative first lens group 10 is constituted by a negative lens element and a positive element, the negative first lens group 10 preferably satisfies condition (7).

If t1/Ymax exceeds the lower limit of condition (7), the overall length of the negative first lens group 10 becomes too long with respect to the maximum image height. Consequently, the overall length of the negative first lens group 10 in an fully-retracted state is undesirably longer.

Specific numerical data of the embodiments will be described hereinafter.

In the diagrams of chromatic aberration (axial chromatic aberration) represented by spherical aberration, the solid line and the two types of dotted lines respectively indicate spherical aberrations with respect to the d, g and C lines.

In the diagrams of lateral chromatic aberration, the two types of dotted lines respectively indicate magnification with respect to the g and C lines; however, the d line as the base line coincides with the ordinate.

In the diagrams of astigmatism, S designates the sagittal image, and M designates the meridional image.

In the tables, FNO. designates the F-number, f designates the focal length of the entire zoom lens system, W designates the half angle-of-view (°), fB designates the back focal distance, r designates the radius of curvature, d designates the lens-element thickness or a distance between lens elements (lens groups) which is variable upon zooming, $N_d$ designates the refractive index of the d-line, and v designates the Abbe number. The values for the distance "d" are indicated in the order of the short focal length extremity, an intermediate focal length and the long focal length extremity.

In addition to the above, an aspherical surface which is symmetrical with respect to the optical axis is defined as follows:

$$x = cy^2/[1+\{1-(1+K)c^2y^2\}^{1/2}] + A4y^4 + A6y^6 + A8y^8 + A10y^{10} \ldots .$$

wherein:

c designates a curvature of the aspherical vertex (1/r);
y designates a distance from the optical axis;
K designates the conic coefficient; and A4 designates a fourth-order aspherical coefficient;
A6 designates a sixth-order aspherical coefficient;
A8 designates a eighth-order aspherical coefficient; and
A10 designates a tenth-order aspherical coefficient.

Embodiment 1

FIG. 1 is the lens arrangement of the standard zoom lens system, at the short focal length extremity, according to the first embodiment of the present invention. FIGS. 2A through 2D show aberrations occurred in the lens arrangement shown in FIG. 1 at the short focal length extremity. FIGS. 3A through 3D show aberrations occurred in the lens arrangement shown in FIG. 1 at an intermediate focal length. FIGS. 4A through 4D show aberrations occurred in the lens arrangement shown in FIG. 1 at the long focal length extremity.

Table 1 shows the numerical values of the first embodiment.

The negative first lens group 10 includes a negative lens element having a concave surface facing toward the image, and a biconvex positive lens element having an aspherical surface on each lens surface, in this order from the object. The biconvex positive lens element is a plastic lens element.

The positive second lens group 20 includes a biconvex positive lens element having an aspherical surface on each lens surface, and cemented lens elements having a biconvex positive lens element and a biconcave negative lens element, in this order from the object. On each aspherical surface, the curvature becomes gentler from the central portion toward the peripheral portion, compared to paraxial spherical surface of the aspherical surface.

The positive third lens group 30 includes a biconvex positive lens element having an aspherical surface on each lens surface, and is formed as a plastic lens element.

The diaphragm S is provided 0.20 in front of the positive second lens group 20 (surface No. 5).

Surfaces Nos. 12 through 15 constitute the cover glass C.

TABLE 1

FNO = 1:2.7-3.7-5.3
f = 6.20-11.00-18.60 (Zoom Ratio = 3.00)
W = 30.4-17.7-11.0
fB = 0.00-0.00-0.00

| Surf. No. | r | d | Nd | ν |
|---|---|---|---|---|
| 1 | 666.732 | 0.70 | 1.74400 | 44.8 |
| 2 | 5.613 | 1.42 | — | — |
| 3* | 12.029 | 1.80 | 1.60610 | 27.1 |
| 4* | −119.201 | 10.73-4.11-0.40 | — | — |
| 5* | 6.101 | 1.50 | 1.69003 | 52.9 |
| 6* | −28.949 | 0.10 | — | — |
| 7 | 9.274 | 1.50 | 1.77250 | 49.6 |
| 8 | −9.274 | 1.58 | 1.69895 | 30.1 |
| 9 | 3.260 | 3.52-8.41-15.01 | — | — |
| 10* | 17.199 | 1.90 | 1.54358 | 55.7 |
| 11* | −13.442 | 2.14-1.55-1.00 | — | — |
| 12 | ∞ | 0.30 | 1.51633 | 64.1 |
| 13 | ∞ | 0.51 | — | — |
| 14 | ∞ | 0.50 | 1.51633 | 64.1 |
| 15 | ∞ | — | — | — |

The symbol * designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 3 | 0.00 | $0.27479 \times 10^{-3}$ | $-0.31671 \times 10^{-4}$ | $0.28060 \times 10^{-5}$ |
| 4 | 0.00 | $-0.26778 \times 10^{-3}$ | $-0.32889 \times 10^{-4}$ | $0.26030 \times 10^{-5}$ |
| 5 | −1.00 | $-0.52635 \times 10^{-4}$ | $0.17932 \times 10^{-4}$ | $0.16325 \times 10^{-5}$ |
| 6 | 0.00 | $0.20577 \times 10^{-3}$ | $0.19325 \times 10^{-4}$ | $0.20812 \times 10^{-5}$ |
| 10 | 0.00 | $0.43419 \times 10^{-3}$ | $-0.26883 \times 10^{-4}$ | $0.34549 \times 10^{-7}$ |
| 11 | 0.00 | $0.91685 \times 10^{-3}$ | $-0.60841 \times 10^{-4}$ | $0.81185 \times 10^{-6}$ |

| Surf. No. | A10 |
|---|---|
| 3 | $-0.77068 \times 10^{-7}$ |
| 4 | $-0.94634 \times 10^{-7}$ |

Embodiment 2

FIG. 5 is the lens arrangement of the standard zoom lens system, at the short focal length extremity, according to the second embodiment of the present invention. FIGS. 6A through 6D show aberrations occurred in the lens arrangement shown in FIG. 5 at the short focal length extremity. FIGS. 7A through 7D show aberrations occurred in the lens arrangement shown in FIG. 5 at an intermediate focal length. FIGS. 8A through 8D show aberrations occurred in the lens arrangement shown in FIG. 5 at the long focal length extremity.

Table 2 shows the numerical values of the second embodiment.

The basic lens arrangement of the second embodiment is the same as that of the first embodiment.

The diaphragm S is provided 0.20 in front of the second lens group 20 (surface No. 5).

TABLE 2

FNO = 1:2.7-3.7-5.3
f = 6.20-11.00-18.60 (Zoom Ratio = 3.00)
W = 30.6-17.7-11.0
fB = 0.00-0.00-0.00

| Surf. No. | r | d | Nd | ν |
|---|---|---|---|---|
| 1 | −230.298 | 0.70 | 1.78590 | 44.2 |
| 2 | 5.837 | 1.38 | — | — |
| 3* | 12.501 | 1.80 | 1.60610 | 27.1 |
| 4* | −58.582 | 10.70-4.04-0.40 | — | — |
| 5* | 6.143 | 1.67 | 1.69400 | 56.3 |
| 6* | −24.958 | 0.10 | — | — |
| 7 | 10.207 | 1.57 | 1.78800 | 47.4 |
| 8 | −8.896 | 1.52 | 1.69895 | 30.1 |
| 9 | 3.314 | 3.66-8.42-15.05 | — | — |
| 10* | 20.351 | 1.90 | 1.54358 | 55.7 |
| 11* | −12.825 | 2.08-1.57-1.00 | — | — |
| 12 | ∞ | 0.30 | 1.51633 | 64.1 |
| 13 | ∞ | 0.51 | — | — |
| 14 | ∞ | 0.50 | 1.51633 | 64.1 |
| 15 | ∞ | — | — | — |

The symbol * designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 3 | 0.00 | 0.25855×10⁻³ | −0.34376×10⁻⁴ | 0.27569 × 10⁻⁵ |
| 4 | 0.00 | −0.26793×10⁻³ | −0.34915×10⁻⁴ | 0.25477 × 10⁻⁵ |
| 5 | −1.00 | 0.87696×10⁻⁴ | 0.17250×10⁻⁴ | 0.46381 × 10⁻⁶ |
| 6 | 0.00 | 0.24558×10⁻³ | 0.20680×10⁻⁴ | 0.44477 × 10⁻⁶ |
| 10 | 0.00 | 0.40912×10⁻³ | −0.26533×10⁻⁴ | 0.15089 × 10⁻⁷ |
| 11 | 0.00 | 0.90757×10⁻³ | −0.61373×10⁻⁴ | 0.83830 × 10⁻⁶ |

| Surf. No. | A10 |
|---|---|
| 3 | −0.81200 × 10⁻⁷ |
| 4 | −0.94552 × 10⁻⁷ |

Aspherical surface data (the aspherical surface coefficients not indicated are zero (0.00)):

| Surf. No. | K | A4 | A6 | A8 |
|---|---|---|---|---|
| 3 | 0.00 | −0.10045×10⁻³ | −0.24056×10⁻⁴ | 0.14601×10⁻⁵ |
| 4 | 0.00 | −0.44351×10⁻³ | −0.16507×10⁻⁴ | −0.91367×10⁻⁶ |
| 5 | −1.00 | 0.13059×10⁻³ | 0.70136×10⁻⁵ | 0.16071×10⁻⁵ |
| 6 | 0.00 | 0.52414×10⁻³ | 0.10338×10⁻⁴ | 0.10924×10⁻⁵ |
| 10 | 0.00 | 0.88153×10⁻⁴ | 0.86423×10⁻⁵ | 0.83515×10⁻⁶ |
| 11 | 0.00 | 0.32272×10⁻³ | −0.87080×10⁻⁵ | 0.16425×10⁻⁵ |

| Surf. No. | A10 |
|---|---|
| 3 | −0.44492×10⁻⁷ |
| 4 | −0.35404×10⁻⁷ |
| 10 | 0.55990×10⁻⁸ |

Embodiment 3

FIG. 9 is the lens arrangement of the standard zoom lens system, at the short focal length extremity, according to the third embodiment of the present invention. FIGS. 10A through 10D show aberrations occurred in the lens arrangement shown in FIG. 9 at the short focal length extremity. FIGS. 11A through 11D show aberrations occurred in the lens arrangement shown in FIG. 9 at an intermediate focal length. FIGS. 12A through 12D show aberrations occurred in the lens arrangement shown in FIG. 9 at the long focal length extremity.

Table 3 shows the numerical values of the third embodiment.

The basic lens arrangement of the third embodiment is the same as that of the first embodiment.

The diaphragm S is provided 0.60 in front of the second lens group 20 (surface No. 5).

TABLE 3

FNO = 1:2.8-3.9-5.6
f = 6.36-10.70-18.60 (Zoom Ratio = 2.92)
W = 31.2-19.0-11.2
fB = 0.00-0.00-0.00

| Surf. No. | r | d | Nd | ν |
|---|---|---|---|---|
| 1 | 148.181 | 0.70 | 1.77250 | 49.6 |
| 2 | 6.763 | 1.40 | — | — |
| 3* | 11.321 | 1.60 | 1.60641 | 27.2 |
| 4* | 49.534 | 12.44-6.31-1.70 | — | — |
| 5* | 5.264 | 1.40 | 1.76802 | 49.3 |
| 6* | −27.910 | 0.10 | — | — |
| 7 | 16.818 | 1.50 | 1.80610 | 40.9 |
| 8 | −6.061 | 0.90 | 1.71736 | 29.5 |
| 9 | 3.304 | 3.93-9.11-16.10 | — | — |
| 10* | 19.838 | 1.90 | 1.54358 | 55.7 |
| 11* | −13.242 | 2.92-1.94-1.50 | — | — |
| 12 | ∞ | 0.50 | 1.51633 | 64.1 |
| 13 | ∞ | 0.50 | — | — |
| 14 | ∞ | 0.50 | 1.51633 | 64.1 |
| 15 | ∞ | — | — | — |

The symbol * designates the aspherical surface which is rotationally symmetrical with respect to the optical axis.

Embodiment 4

FIG. 13 is the lens arrangement of the standard zoom lens system, at the short focal length extremity, according to the fourth embodiment of the present invention. FIGS. 14A through 14D show aberrations occurred in the lens arrangement shown in FIG. 13 at the short focal length extremity. FIGS. 15A through 15D show aberrations occurred in the lens arrangement shown in FIG. 13 at an intermediate focal length. FIGS. 16A through 16D show aberrations occurred in the lens arrangement shown in FIG. 13 at the long focal length extremity.

Table 4 shows the numerical values of the fourth embodiment.

The basic lens arrangement of the fourth embodiment is the same as that of the first embodiment.

The diaphragm S is provided 0.60 in front of the second lens group 20 (surface No. 5).

TABLE 4

FNO = 1:2.7-3.9-5.6
f = 6.20-10.80-18.60 (Zoom Ratio = 3.00)
W = 30.9-18.2-11.1
fB = 0.00-0.00-0.00

| Surf. No. | r | d | Nd | ν |
|---|---|---|---|---|
| 1 | −816.326 | 0.70 | 1.77250 | 49.6 |
| 2 | 6.750 | 1.15 | — | — |
| 3* | 13.298 | 1.67 | 1.60641 | 27.2 |
| 4* | −255.679 | 12.50-6.31-1.70 | — | — |
| 5* | 5.632 | 1.40 | 1.77250 | 49.6 |
| 6* | −75.406 | 0.10 | — | — |
| 7 | 9.461 | 1.50 | 1.83481 | 42.7 |
| 8 | −11.797 | 0.90 | 1.74000 | 28.3 |
| 9 | 3.212 | 3.30-9.21-16.04 | — | — |
| 10* | 21.000 | 2.00 | 1.54358 | 55.7 |
| 11* | −12.463 | 2.87-1.58-1.20 | — | — |
| 12 | ∞ | 0.50 | 1.51633 | 64.1 |
| 13 | ∞ | 0.51 | — | — |
| 14 | ∞ | 0.50 | 1.51633 | 64.1 |
| 15 | ∞ | — | — | — |

The symbol * designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 3 | 0.00 | −0.26646×10⁻³ | −0.36476×10⁻⁴ | 0.43423×10⁻⁵ |
| 4 | 0.00 | −0.65078×10⁻³ | −0.20841×10⁻⁴ | 0.32521×10⁻⁵ |
| 5 | −1.00 | 0.78164×10⁻⁴ | 0.30633×10⁻⁴ | −0.84233×10⁻⁶ |
| 6 | 0.00 | 0.16344×10⁻³ | 0.36863×10⁻⁴ | −0.19983×10⁻⁵ |
| 10 | 0.00 | 0.88836×10⁻³ | 0.43376×10⁻⁴ | −0.13734×10⁻⁵ |
| 11 | 0.00 | −0.91563×10⁻³ | 0.45736×10⁻⁴ | −0.13838×10⁻⁵ |

| Surf. No. | A10 |
|---|---|
| 3 | −0.11444 × 10⁻⁶ |
| 4 | −0.10207 × 10⁻⁶ |
| 10 | −0.50927 × 10⁻⁸ |

Embodiment 5

FIG. 17 is the lens arrangement of the standard zoom lens system, at the short focal length extremity, according to the fifth embodiment of the present invention. FIGS. 18A through 18D show aberrations occurred in the lens arrangement shown in FIG. 17 at the short focal length extremity. FIGS. 19A through 19D show aberrations occurred in the lens arrangement shown in FIG. 17 at an intermediate focal length.

FIGS. 20A through 20D show aberrations occurred in the lens arrangement shown in FIG. 17 at the long focal length extremity.

Table 5 shows the numerical values of the fifth embodiment.

The basic lens arrangement of the fifth embodiment is the same as that of the first embodiment.

The diaphragm S is provided 0.60 in front of the second lens group 20 (surface No. 5).

TABLE 5

FNO = 1:2.6-3.9-5.6
f = 6.20-10.80-18.60 (Zoom Ratio = 3.00)
W = 30.9-18.2-11.1
fB = 0.00-0.00-0.00

| Surf. No. | r | d | Nd | ν |
|---|---|---|---|---|
| 1 | 143.227 | 0.70 | 1.69680 | 55.5 |
| 2 | 7.384 | 1.15 | — | — |
| 3* | 14.744 | 1.67 | 1.63200 | 23.0 |
| 4* | 42.360 | 12.42-6.46-1.70 | — | — |
| 5* | 6.095 | 1.40 | 1.77250 | 49.6 |
| 6* | −150.295 | 0.10 | — | — |
| 7 | 7.871 | 1.50 | 1.83481 | 42.7 |
| 8 | −13.316 | 0.90 | 1.74000 | 28.3 |
| 9 | 3.244 | 3.16-9.09-15.65 | — | — |
| 10* | 21.000 | 2.00 | 1.54358 | 55.7 |
| 11* | −11.095 | 2.79-1.45-1.20 | — | — |
| 12 | ∞ | 0.50 | 1.51633 | 64.1 |
| 13 | ∞ | 0.51 | — | — |
| 14 | ∞ | 0.50 | 1.51633 | 64.1 |
| 15 | ∞ | — | — | — |

The symbol * designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 3 | 0.00 | −0.52269×10⁻³ | −0.42503×10⁻⁴ | 0.50832×10⁻⁵ |
| 4 | 0.00 | −0.79482×10⁻³ | −0.27071×10⁻⁴ | 0.49025×10⁻⁵ |
| 5 | −1.00 | 0.34319×10⁻⁴ | 0.28975×10⁻⁴ | −0.30644×10⁻⁵ |
| 6 | 0.00 | 0.87116×10⁻⁴ | 0.28503×10⁻⁴ | −0.42102×10⁻⁵ |
| 10 | 0.00 | −0.84776×10⁻³ | 0.34311×10⁻⁴ | −0.40988×10⁻⁶ |
| 11 | 0.00 | −0.71770×10⁻³ | 0.30467×10⁻⁴ | −0.28829×10⁻⁶ |

| Surf. No. | A10 |
|---|---|
| 3 | −0.11450 × 10⁻⁶ |
| 4 | −0.13072 × 10⁻⁶ |
| 10 | −0.53036 × 10⁻⁸ |

The numerical values of each condition for each embodiment are shown in Table 6.

TABLE 6

| | Embod. 1 | Embod. 2 | Embod. 3 | Embod. 4 | Embod. 5 |
|---|---|---|---|---|---|
| Cond.(1) | 0.175 | 0.178 | 0.178 | 0.173 | 0.173 |
| Cond.(2) | 1.690 | 1.694 | 1.768 | 1.773 | 1.773 |
| Cond.(3) | 52.900 | 56.290 | 49.260 | 49.600 | 49.600 |
| Cond.(4) | −0.847 | −0.868 | −0.679 | −0.775 | −0.483 |
| Cond.(5) | 0.674 | 0.641 | 0.691 | 0.704 | 0.752 |
| Cond.(6) | 0.100 | 0.088 | 0.124 | 0.145 | 0.154 |
| Cond.(7) | 1.113 | 1.102 | 1.051 | 1.000 | 1.000 |
| Power Ratio of each Lens Group | | | | | |
| 1st Lens Group | 1.0 | 1.0 | 1.0 | 1.0 | 1.0 |
| 2nd Lens Group | −1.605 | 1.573 | −1.570 | −1.576 | −1.645 |
| 3rd Lens Group | −1.081 | −1.008 | −1.085 | −1.110 | −1.237 |

As can be understood from Table 6, the first through fifth embodiments satisfy conditions (1) through (7). Furthermore, as can be understood from the aberration diagrams, the various aberrations are adequately corrected.

According to the present invention, a smaller standard zoom lens system having the following features can be attained:

(i) an angle-of-view is approximately from 22° to 62°;
(ii) a zoom ratio is approximately 3; and
(iii) optical performance is excellent.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A standard zoom lens system comprises a negative first lens group, a positive second lens group, and a positive third lens group, in this order from an object,
    wherein upon zooming from the short focal length extremity to the long focal length extremity, the distance between said negative first lens group and said positive second lens group decreases, and the distance between said positive second lens group and said positive third lens group increases;
    wherein said negative first lens group comprises a negative lens element and a positive lens element, in this order from the object;

wherein the most image-side surface of the positive second lens group comprises a concave surface; and wherein said standard zoom lens system satisfies the following conditions:

$$0.15 < Rs/fT < 0.173$$

wherein

Rs designates the radius of curvature of the most image-side surface of said positive second lens group (Rs>0); and fT designates the focal length of said entire standard zoom lens system at the long focal length extremity when an object at an infinite distance is in an in-focus state; and $$1.65 < NP2$$

wherein

NP2 designates the refractive index of the d-line of the most object-side positive lens element of said positive second lens group;

wherein said positive lens element of said negative first lens group comprises a plastic lens element having at least one aspherical surface.

2. The standard zoom lens system according to claim 1, wherein said positive second lens group comprises a biconvex positive lens element, and cemented lens elements having a positive lens element and a negative lens element, in this order from the object.

3. A camera having said standard zoom lens system according to claim 2 satisfies the following condition:

$$t1/Y\max < 1.2$$

wherein t1 designates the distance from the most object-side surface to the most image-side surface of said negative first lens group; and Ymax designates the maximum image height at the image plane on which an image through said entire standard zoom lens system is formed.

4. The standard zoom lens system according to claim 1, satisfying the following condition:

$$45 < vp$$

wherein vp designates the Abbe number of the most object-side positive lens element of said positive second lens group.

5. A camera having said standard zoom lens system according to claim 4 satisfies the following condition:

$$t1/Y\max < 1.2$$

wherein t1 designates the distance from the most object-side surface to the most image-side surface of said negative first lens group; and Ymax designates the maximum image height at the image plane on which an image through said entire standard zoom lens system is formed.

6. The standard zoom lens system according to claim 1, satisfying the following condition:

$$-1.0 < f1/f1p < -0.3$$

wherein $$f1 < 0;$$

f1 designates the focal length of said negative first lens group; and f1p designates the focal length of said positive plastic lens element of said negative first lens group.

7. A camera having said standard zoom lens system according to claim 6 satisfies the following condition:

$$t1/Y\max < 1.2$$

wherein t1 designates the distance from the most object-side surface to the most image-side surface of said negative first lens group; and Ymax designates the maximum image height at the image plane on which an image through said entire standard zoom lens system is formed.

8. The standard zoom lens system according to claim 1, wherein said positive third lens group functions as a focusing lens group which is movable along the optical axis with respect to an object at a close-distance.

9. A camera having said standard zoom lens system according to claim 8 satisfies the following condition:

$$t1/Y\max < 1.2$$

wherein t1 designates the distance from the most object-side surface to the most image-side surface of said negative first lens group; and Ymax designates the maximum image height at the image plane on which an image through said entire standard zoom lens system is formed.

10. The standard zoom lens system according to claim 1, wherein said positive third lens group comprises a biconvex positive plastic lens element having at least one aspherical surface.

11. A camera having said standard zoom lens system according to claim 10 satisfies the following condition:

$$t1/Y\max < 1.2$$

wherein t1 designates the distance from the most object-side surface to the most image-side surface of said negative first lens group; and Ymax designates the maximum image height at the image plane on which an image through said entire standard zoom lens system is formed.

12. The standard zoom lens system according to claim 10, satisfying the following condition:

$$0.6 < f2/f3p < 1.0$$

wherein f2 designates the focal length of said positive second lens group; and f3p designates the focal length of said biconvex positive plastic lens element of said positive third lens group.

13. A camera having said standard zoom lens system according to claim 12 satisfies the following condition:

$$t1/Y\max < 1.2$$

wherein t1 designates the distance from the most object-side surface to the most image-side surface of said negative first lens group; and Ymax designates the maximum image height at the image plane on which an image through said entire standard zoom lens system is formed.

14. The standard zoom lens system according to claim 1, wherein said positive third lens group is arranged to move monotonically toward the image upon zooming from the short focal length extremity to the long focal length extremity; and wherein said standard zoom lens system satisfies the following condition:

$$0.05 < \log(m3t/m3w)/\log(fT/fW) < 0.3$$

wherein fT designates the focal length of said entire standard zoom lens system at the long focal length extremity when an object at an infinite distance is in an in-focus state;

fW designates the focal length of said entire standard zoom lens system at the short focal length extremity when an object at an infinite distance is in an in-focus state;

m3t designates a magnification of said positive third lens group at the long focal length extremity when an object at an infinite distance is in an in-focus state; and m3W designates a magnification of said positive third lens group at the short focal length extremity when an object at an infinite distance is in an in-focus state.

15. A camera having said standard zoom lens system according to claim 14 satisfies the following condition:

$$t1/Y\max < 1.2$$

wherein t1 designates the distance from the most object-side surface to the most image-side surface of said negative first lens group; and Ymax designates the maximum image height at the image plane on which an image through said entire standard zoom lens system is formed.

16. The standard zoom lens system according to claim 1, wherein in said positive second lens group, each lens surface of the most object-side positive lens element comprises an aspherical surface on which the curvature becomes gentler from the central portion toward the peripheral portion, compared to paraxial spherical surface of the aspherical surface.

17. A camera having said standard zoom lens system according to claim 16 satisfies the following condition:

$$t1/Y\max < 1.2$$

wherein t1 designates the distance from the most object-side surface to the most image-side surface of said negative first lens group; and Ymax designates the maximum image height at the image plane on which an image through said entire standard zoom lens system is formed.

18. A camera having said standard zoom lens system according to claim 1 satisfies the following condition:

$$t1/Y\max < 1.2$$

wherein t1 designates the distance from the most object-side surface to the most image-side surface of said negative first lens group; and Ymax designates the maximum image height at the image plane on which an image through said entire standard zoom lens system is formed.

* * * * *